United States Patent
Park

(10) Patent No.: US 9,658,731 B2
(45) Date of Patent: May 23, 2017

(54) TOUCH WINDOW AND MANUFACTURING METHOD THEREOF

(71) Applicant: LG INNOTEK CO., LTD., Seoul (KR)

(72) Inventor: Jewon Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 216 days.

(21) Appl. No.: 13/930,727

(22) Filed: Jun. 28, 2013

(65) Prior Publication Data

US 2014/0003055 A1 Jan. 2, 2014

(30) Foreign Application Priority Data

Jun. 29, 2012 (KR) .................. 10-2012-0070491

(51) Int. Cl.
*G06F 3/0488* (2013.01)
*G06F 3/047* (2006.01)
*G06F 3/041* (2006.01)

(52) U.S. Cl.
CPC ............. *G06F 3/047* (2013.01); *G06F 3/041* (2013.01); *G06F 2203/04103* (2013.01); *G06F 2203/04113* (2013.01)

(58) Field of Classification Search
None
See application file for complete search history.

(56) References Cited

U.S. PATENT DOCUMENTS

| | | | | |
|---|---|---|---|---|
| 8,780,284 B2* | 7/2014 | Kurashima | ..................... | 349/12 |
| 2002/0000979 A1* | 1/2002 | Furuhashi et al. | ............ | 345/173 |
| 2009/0280332 A1* | 11/2009 | Akutsu | ................. | C08F 290/06 |
| | | | | 428/423.1 |
| 2009/0322704 A1* | 12/2009 | Anno | ............................. | 345/174 |
| 2010/0075720 A1* | 3/2010 | Lee et al. | ...................... | 455/566 |
| 2010/0097346 A1* | 4/2010 | Sleeman | ....................... | 345/174 |
| 2010/0144394 A1* | 6/2010 | Han et al. | ...................... | 455/566 |
| 2011/0109590 A1* | 5/2011 | Park | ............................... | 345/174 |
| 2011/0115731 A1* | 5/2011 | Kuwajima | .................... | 345/173 |
| 2011/0209901 A1* | 9/2011 | MacDonald et al. | ......... | 174/254 |
| 2011/0242465 A1* | 10/2011 | Lee et al. | ...................... | 349/110 |
| 2011/0262631 A1* | 10/2011 | Lee | ......................... | G06F 3/044 |
| | | | | 427/123 |
| 2011/0298728 A1* | 12/2011 | Kim | ........................ | G06F 3/045 |
| | | | | 345/173 |
| 2012/0032917 A1* | 2/2012 | Yamaguchi | .................... | 345/174 |
| 2012/0153239 A1* | 6/2012 | Chandrasekhar et al. | .... | 252/514 |
| 2012/0313867 A1* | 12/2012 | Luo et al. | ...................... | 345/173 |
| 2013/0076712 A1* | 3/2013 | Zheng et al. | .................. | 345/207 |
| 2013/0293096 A1* | 11/2013 | Kang et al. | ................... | 313/511 |

* cited by examiner

*Primary Examiner* — Amare Mengistu
*Assistant Examiner* — Crystal A Mathews
(74) *Attorney, Agent, or Firm* — Saliwanchik, Lloyd & Eisenchenk

(57) ABSTRACT

Disclosed are a touch window and a manufacturing method thereof. The touch window includes conductive polymer. In the touch window, a light source and/or a connector are provided in a touch screen panel due to the conductive polymer.

9 Claims, 5 Drawing Sheets

TOUCH WINDOW AND MANUFACTURING METHOD THEREOF

CROSS-REFERENCE TO RELATED APPLICATION

This application claims the benefit under 35 U.S.C. §119 of Korean Patent Application No. 10-2012-0070491, filed Jun. 29, 2012, which is hereby incorporated by reference in its entirety.

BACKGROUND

A touch window is installed on a display surface of an image display device such as a cathode ray tube (CRT), a liquid crystal display (LCD), a field emission display (FED), a plasma display panel (PDP), and an electro-luminescence device (ELD), so that a user inputs predetermined information into an electronic appliance by pressing the touch panel while viewing the image display device.

FIG. 1 is a view showing one example in which a touch screen panel is bonded to an FPCB according to the related art.

Referring to FIG. 1, a touch window includes a cover window to receive an external touch input therein, a touch screen panel (TSP) including a view area (V/A) to receive the touch input through an electrode pattern formed under the cover window and a dead area (D/A) that does not receive the touch input, and a command icon pattern part electrically connected with the touch screen panel and realized in the form of buttons (icons) at a function area (F/A) of the transparent window.

The D/A includes a wiring area having a wiring pattern formed corresponding to the electrode pattern of the V/A and a pad area 10 to transmit a touch sensing signal, which is received therein through the wiring pattern, to a driving chip. Accordingly, the touch window is coupled with a flexible printed circuit board (FPCB) 20 embedded with a driving chip through the pad area 10.

According to the related art, after separately forming the pad area 10 and the FPCB 20, an anisotropic conductive film (ACF) bonding process must be performed to couple the pad area 10 with the FPCB 20. In addition, when performing the ACF bonding process, in order to smoothly bond the pad area 10 with the FPCB 20, silver (Ag) must be coated on the pad area 10 and soldered at the high temperature of 250° C. or more.

However, a process of separately forming the pad area 10 and the FPCB 20 and bonding the pad area 10 to the FPCB 20 requires many process costs and long time. In addition, the high-temperature soldering process causes damages to parts mounted on the touch screen panel.

FIG. 2 is a view showing one example in which a light source is mounted in the touch screen panel according to the related art.

Referring to FIG. 2, in order to mount a light source for a button part formed in the F/A of the touch window according to the related art, an additional icon backlight LED module is used. In other words, since the light source cannot be directly mounted in the F/A, an additional module to mount the light source therein must be provided.

BRIEF SUMMARY

According to the embodiment, there is provided a touch window including a cover window including an active area and a dead area, a sensing electrode pattern part on the active area, a wiring electrode pattern part on the dead area, and a conductive polymer part on the dead area. A connector connected with the wiring electrode pattern part is mounted on the conductive polymer part.

According to the embodiment, there is provided a touch window including a touch screen panel including an active area, in which a touch input is detected, and a dead area in which the touch input is not detected, a function area electrically connected with the touch screen panel and having a command icon pattern, and a conductive polymer part provided in the function area and having a light source mounted thereon.

According to the embodiment, there is provided a touch window including a touch screen panel including an active area, in which a touch input is detected, and a dead area in which the touch input is not detected, a function area electrically connected with the touch screen panel and having a command icon pattern, and a first conductive polymer part provided in the function area and having a light source mounted thereon. The touch screen panel includes a sensing electrode pattern part on the active area, a wiring electrode pattern part on the dead area, and a second conductive polymer part on the dead area. A connector connected with the wiring electrode pattern part is mounted on the second conductive polymer part.

As described above, according to one embodiment, since the connector including a driving chip is directly mounted on the touch screen panel by using the conductive polymer part, an ACF bonding process can be omitted, so that the process can be simplified.

According to one embodiment, the light source outputting light in the direction of the command icon pattern formed in the function area can be directly mounted on the touch screen panel by using the conductive polymer part, so that an additional module to mount the light source in the function area is not required. Accordingly, the convenience in the process can be enhanced.

DETAILED DESCRIPTION

Figure 1:
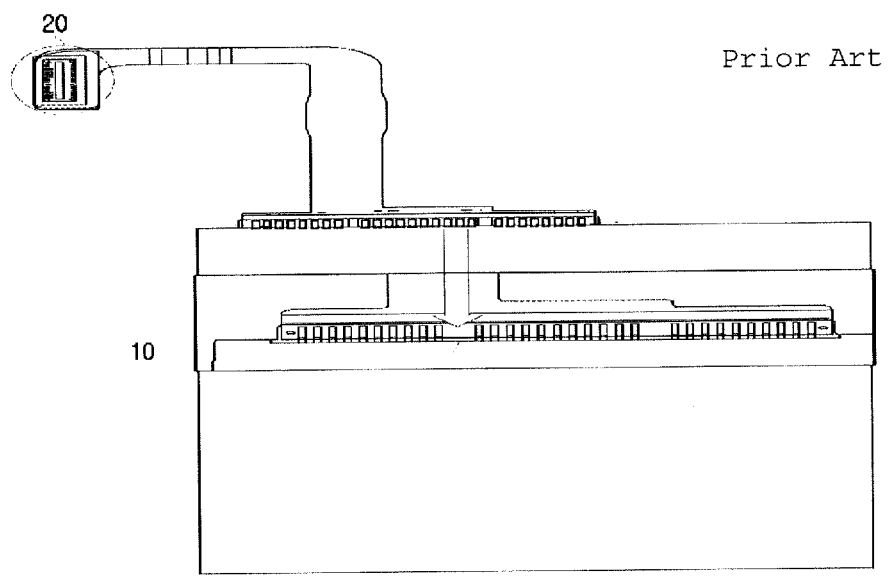
FIG. 1 is a view showing one example in which a touch screen panel is bonded to an FPCB according to the related art.
Figure 2:
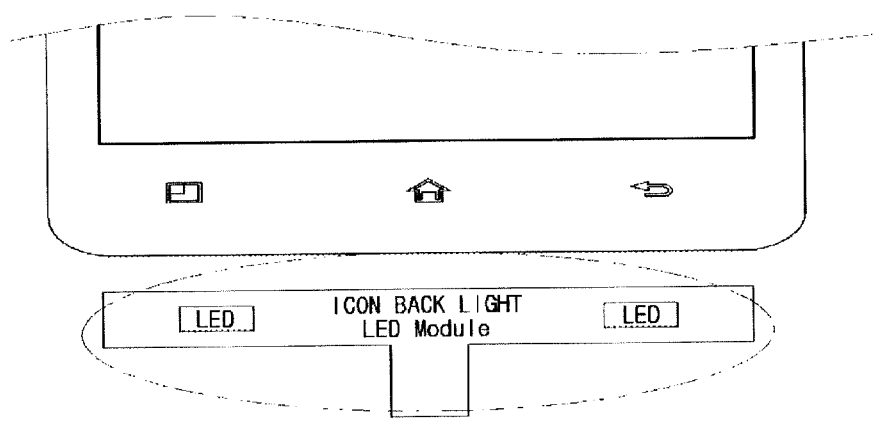
FIG. 2 is a view showing one example in which a light source is mounted in the touch screen panel according to the related art.

Hereinafter, the structure and the operation according to the embodiment will be described in detail with reference to accompanying drawings. In the following description based on the accompanying drawings, the same elements will be assigned with the same reference numerals regardless of drawing numbers, and the repetition in the description of the same elements having the same reference numerals will be omitted in order to avoid redundancy. Although the terms "first" and "second" may be used in the description of various elements, the embodiment is not limited thereto. The terms "first" and "second" are used to distinguish one element from the other elements.

Figure 3:
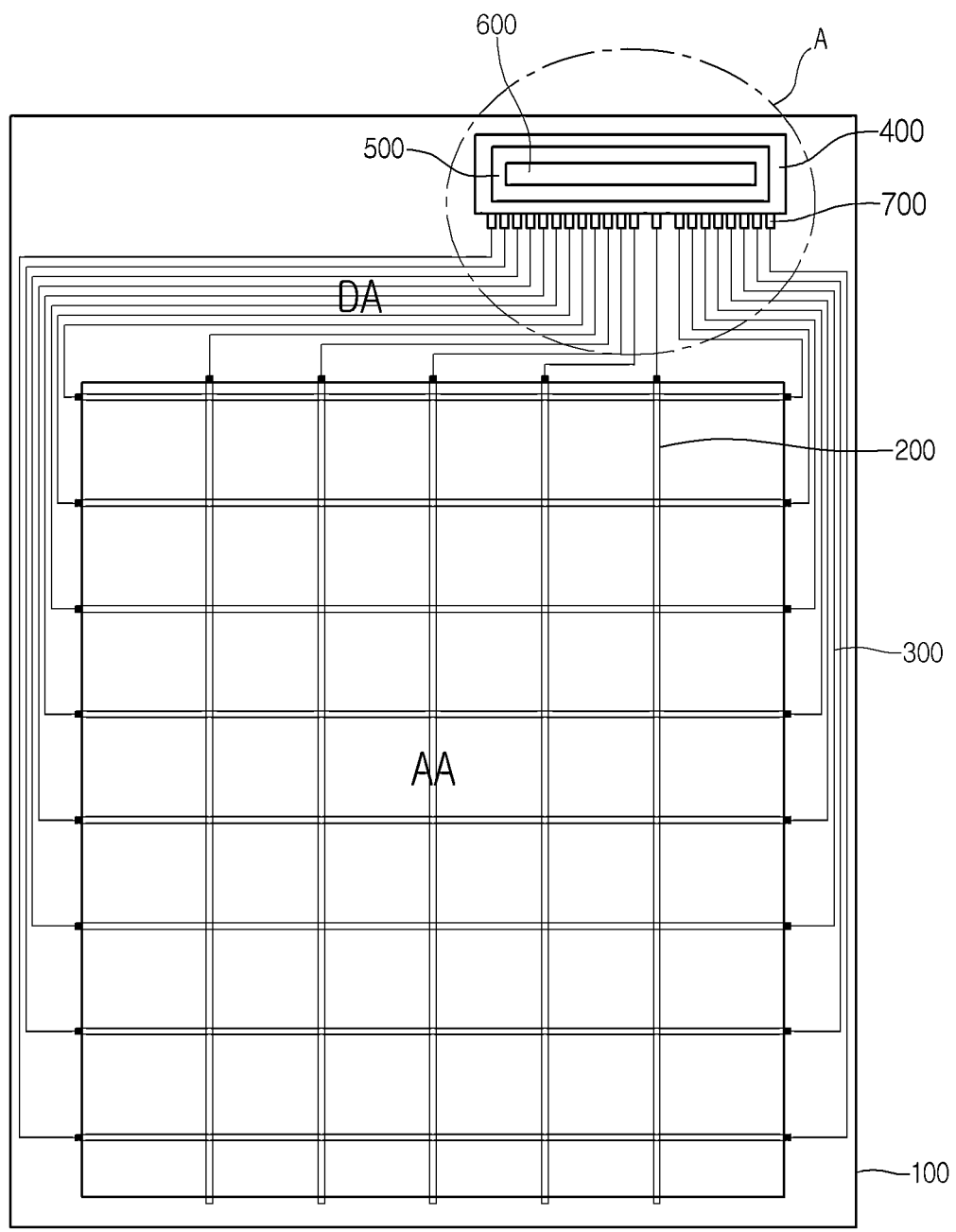
FIG. 3 is a view showing one example in which a connector is mounted on the touch screen panel by using the conductive polymer part according to the first embodiment.
Figure 4:
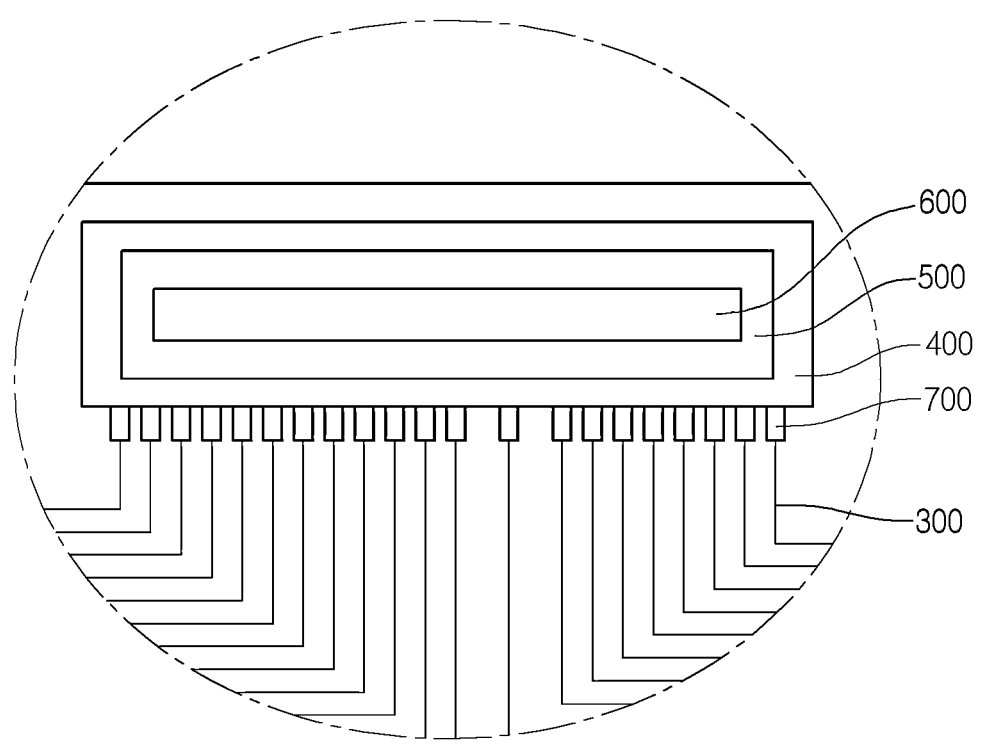
FIG. 4 is an enlarged view showing a part A of FIG. 3.

FIGS. 3 and 4 are views showing a touch window according to the first embodiment.

Referring to FIGS. 3 and 4, the touch window according to the first embodiment includes a cover window 100 including an active area AA and a dead area DA, a sensing electrode pattern part 200 formed on the active area AA, a wiring electrode pattern part 300 formed on the dead area DA, and a conductive polymer part 400 formed on the dead area DA. In addition, the conductive polymer part 400 is provided therein with a connector 500 connected with the wiring electrode pattern part 300.

The cover window 100 may include glass or plastic. For example, the cover window 100 may include tempered glass, semi-tempered glass, soda lime glass or tempered plastic.

The cover window 100 may include the active area AA and the dead area DA. The active area AA refers to an area through which a touch command may be input by a user. To the contrary to the active area AA, the dead area DA refers to an area to which the touch command is not input because the UA is not activated even if the touch of the user is input thereto.

The sensing electrode pattern part 200 is formed on the active area AA. The sensing electrode pattern part 200 includes a first sensing electrode pattern formed in a longitudinal direction and a second sensing electrode pattern formed in a horizontal direction. The sensing electrode pattern part 200 is densely formed on a front surface of the active area AA of the cover window 100.

The first and second sensing electrode patterns may be formed through various schemes depending on the structure of the touch panel.

For example, the first and second sensing electrode patterns may be formed on one surface of the cover window.

In addition, the first sensing electrode pattern may be formed on one surface of the cover window, and the second sensing electrode pattern may be formed on one surface of a substrate provided on the cover window.

In addition, the first sensing electrode pattern may be formed on one surface of a first substrate provided on the cover window, and the second sensing electrode pattern may be formed on a second substrate provided on the first substrate.

In addition, the first sensing electrode pattern may be formed on one surface of a glass provided on the cover window, and the second sensing electrode pattern may be provided on an opposite surface of the glass.

The touch window according to the embodiment may have various structures depending on the first and second sensing electrode patterns described above. However, the embodiment is not limited thereto, and the first and second sensing electrode patterns may be formed at various positions.

The wiring electrode pattern part 300 is formed on the dead area DA. The wiring electrode pattern part 300 is electrically connected with the sensing electrode pattern part 200. The wiring electrode pattern part 300 may transmit the touch sensing signal detected from the sensing electrode pattern part 200 to the connector 500, and the connector 500 includes a driving chip 600 driven by the touch sensing signal.

For example, the wiring electrode pattern part 300 and the connector 500 may be connected with each other through a plurality of pad parts 700. In detail, the wiring electrode pattern part 300 may be connected with the connector 500 through a silver (Ag) pad part.

The connector 500 may be provided on the conductive polymer part 400. In detail, the conductive polymer part 400 may be positioned on the dead area DA of the cover window 100, and the connector 500 may be mounted on the conductive polymer part 400.

The conductive polymer part 400 may include a conductive material that is curable at a normal (room) temperature or less. For example, the conductive polymer part 400 may include at least one of conductive materials such as Teflon, acryl, and urethane.

The conductive polymer part 400 may be formed by coating the above material in the form of a paste on the dead area DA and curing the resultant structure.

Accordingly, in the touch window according to the embodiment, the conductive polymer part 400 is provided in the dead area DA of the cover window 100, and the connector 500 including the driving chip 600 is mounted on the conductive polymer part 400, thereby directly providing the connector 500 on a touch screen panel.

According to the related art, after mounting a connector on an additional FPCB, the FPCB is bonded to a touch screen panel through an ACF bonding process. In other words, when a part such as a connector is directly mounted on a touch screen panel, a soldering process must be performed at the temperature of 250° C. or more. Accordingly, parts are not directly mounted on the touch screen panel, but an additional process of bonding an FPCB to the touch screen panel is performed after parts are mounted on the FPCB.

However, when bonding the FPCB to the touch screen panel, the reliability is reduced due to the bonding failure, and the process efficiency is degraded due to the additional process.

Therefore, according to the touch window of the embodiment, parts may be directly mounted on the dead area of a cover window by using a conductive polymer part. In other words, the conductive polymer part cured at the normal (room) temperature or less is formed on the dead area of the cover window, and a part such as a connector may be mounted on the conductive polymer part.

Accordingly, since an additional part set such as an FPCB is not required, the bonding process between the FPCB and the touch screen panel may be omitted. Therefore, the touch window according to the embodiment may inhibit the reliability from being degraded due to the failure in the bonding process, so that the process efficiency can be improved.

Figure 5:
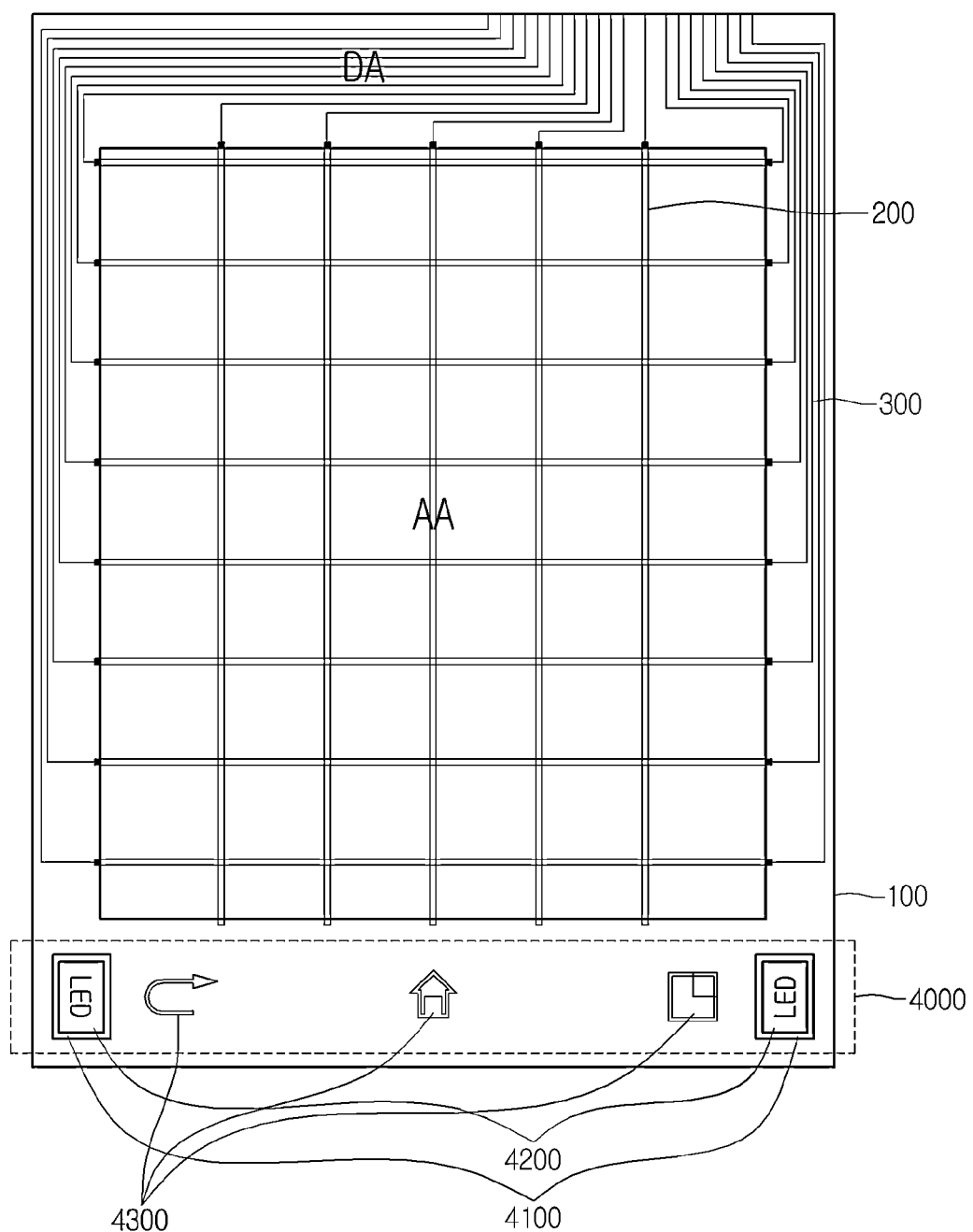
FIG. 5 is a view showing one example in which a light source is mounted on a touch screen panel by using the conductive polymer part according to the second embodiment.

Hereinafter, a touch window according to the second embodiment will be described in detail with reference to FIG. 5. The following description of the second embodiment will be made based on the description of the touch window according to the first embodiment.

Referring to FIG. 4, the touch window according to the second embodiment includes a touch screen panel (TSP) 100 including an active area AA, in which a touch input is detected, and a dead area DA in which the touch input is not detected, a function area (F/A) 4000 electrically connected with the touch screen panel 100 and having a command icon pattern, and a conductive polymer part 4100 provided in the F/A 4000 and having a light source 4200 mounted therein.

The active area AA refers to an area in which a touch command may be input by a user. To the contrary to the active area AA, the dead area DA refers to an area in which the touch command is not input because the dead area DA is not activated even if the touch of the user is input thereto.

The sensing electrode pattern part 200 is formed on the active area AA. In addition, the wiring electrode pattern part 300 electrically connected with the sensing electrode pattern part 200 is formed on the dead area DA.

The wiring electrode pattern part 300 is electrically connected with the FPCB in which a connector including a driving chip is mounted, so that the touch sensing signal detected from the sensing electrode pattern part 200 is transmitted to the connector. The connector receives the touch sensing signal, and the driving chip may be driven according to the touch sensing signal. In addition, the touch screen panel and the FPCB may be bonded to each other through an ACF bonding process.

The light source 4200 may be provided in the F/A 4000. In detail, the conductive polymer part 4100 is formed in the F/A 4000, and the light source 4200 may be mounted on the conductive polymer part 4100.

The conductive polymer part 4100 may include a conductive material cured at a normal (room) temperature or less. For example, the conductive polymer part 4100 may include at least one of conductive materials such as Teflon, acryl, and urethane. Conductive polymer parts 4100 may be provided at left and right lateral surfaces of the F/A 4000.

The conductive polymer part 4100 may be formed by coating the above material in the form of a paste on the dead area DA and curing the resultant structure.

In addition, the light source 4200 may include a lateral type light emitting diode (LED). In detail, light sources 4200 may output lights rightward and leftward within the F/A 4000.

The lights output from the light sources 4200 are incident onto command icon patterns 4300 formed in the F/A 4000. In detail, when touch pressure is applied to the command icon patterns 4300, the light sources 4200 perform a blinking function such that the touch state may be fedback. In other words, the light source 4200 outputs lights in the direction of the command icon patterns 4300. The command icon patterns 4300 receive lights output from the light source 4200 and blink The F/A 4000 may further include a diffusion sheet to diffuse or scatter the lights. The diffusion sheet may include various resins such as polycarbonate. Accordingly, the lights output from the light source are uniformly diffused in the direction of the command icon patterns, and incident into the command icon patterns.

According to the related art, an additional module including a light source such as a light emitting diode is required separately from the F/A. Accordingly, an additional process of bonding the module to the touch screen panel may be required, and the reliability may be reduced due to the failure in the bonding process.

Therefore, according to the touch window of the embodiment, the light source is not provided in the form of the additional module, but the light source may be mounted onto the conductive polymer part after forming the conductive polymer part, which is curable at the normal (room) temperature or less, in the F/A.

Therefore, since an additional LCD module is not required, the process efficiency can be improved, and the reliability of the touch window can be improved.

Figure 6:
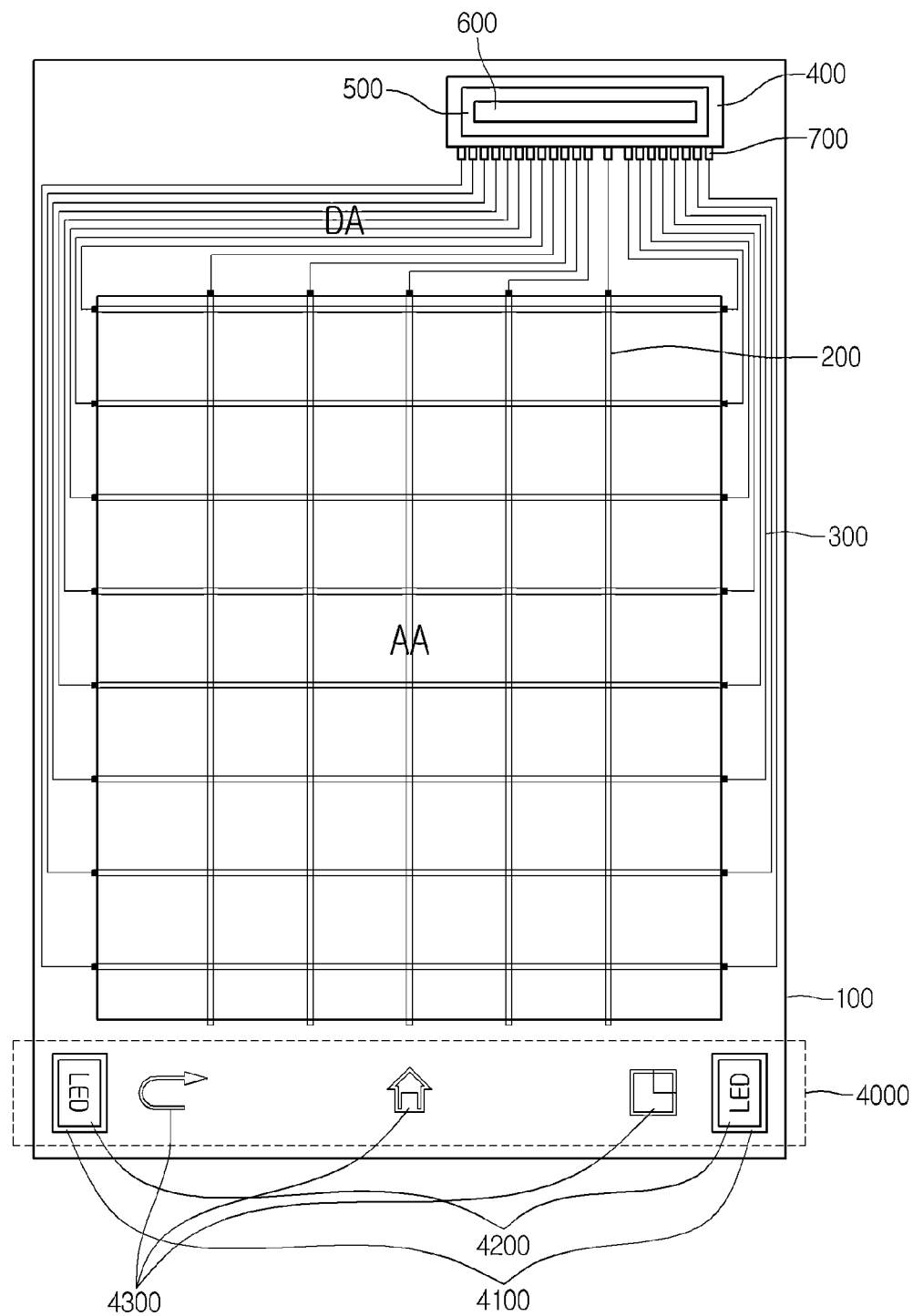
FIG. 6 is a view showing one example in which a light source is mounted on a touch screen panel by using the conductive polymer part according to third embodiment.

Hereinafter, a touch window according to the third embodiment will be described with reference to FIG. 6.

The following description of the touch window according to the third embodiment will be made based on the above description of the touch window according to the first and second embodiments. In other words, the above description of the touch window according to the first and second embodiments may be essentially incorporated herein by reference.

The touch window according to the third embodiment includes the above-described touch window according to the first embedment, a touch screen panel (TSP) according to the second embodiment including an active area, in which a touch input is detected, and a dead area in which the touch input is not detected, a function area F/A electrically connected with the touch screen panel and having a command icon pattern, and a first conductive polymer part provided in the F/A and having the light source mounted therein. The touch screen panel includes a sensing electrode pattern part formed on the active area, a wiring electrode pattern part formed in the dead area, and a second conductive polymer part formed in the dead area. The second conductive polymer part has a connector connected with the wiring electrode pattern part.

In other words, the touch window according to the third embodiment may include the combination of features of the touch window according to the first embodiment and features of the touch window according to the second embodiment.

The touch window according to the third embodiment includes first and second conductive polymer parts. The first and second conductive polymer parts may include a conductive material curable at the temperature or less. For example, the first conductive polymer part or the second conductive polymer part includes at least one of conductive materials such as Teflon, acryl, and urethane. The first and second conductive polymer parts may include the same conductive material or conductive materials different from each other.

The first conductive polymer part may be provided in the F/A and the second conductive polymer part may be provided in the dead area.

The first conductive polymer part has a light source mounted thereon, and the second conductive polymer part has a connector including a driving chip.

Therefore, according to the touch window of the third embodiment, the light source such as an LED and the connector may be provided on the touch screen panel through the conductive polymer part. Accordingly, since an additional module and/or an additional FPCB are not separately required, the process efficiency can be improved. In addition, the failure caused by the module and the FPCB can be reduced, so that the reliability of the touch window can be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A touch window comprising:
a cover window comprising an active area and a dead area;
a sensing electrode pattern part on the active area;
a wiring electrode pattern part on the dead area; and
a conductive polymer part on the dead area,
wherein a connector connected with the wiring electrode pattern part is mounted on the conductive polymer part,
wherein the wiring electrode pattern part transmits a touch sensing signal detected from the sensing electrode pattern part, and the connector comprises a driving chip driven according to the touch sensing signal, wherein the conductive polymer part is in direct physical contact with the cover window, wherein the connector and the driving chip are disposed on the dead area of the cover window, wherein the active area is displayed on a screen of the touch window, wherein the sensing electrode pattern part is connected with the wiring electrode pattern part;

wherein the sensing electrode pattern part, the wiring electrode pattern part, and the conductive polymer part are all in direct physical contact with a same surface of the cover window; and wherein the conductive polymer part is spaced apart from the active area.

2. The touch window of claim 1, wherein the wiring electrode pattern part is connected with the connector through a pad part.

3. The touch window of claim 1, wherein the conductive polymer part comprises at least one of conductive materials comprising Teflon, acryl, and urethane.

4. The touch window of claim 1, wherein the sensing electrode pattern part comprises first and second sensing electrode patterns on one surface of the cover window.

5. The touch window of claim 1, wherein the sensing electrode pattern part comprises:
   a first sensing electrode pattern on one surface of the cover window; and
   as second sensing electrode pattern on one surface of a substrate provided on the cover window.

6. The touch window of claim 1, wherein the sensing electrode pattern part comprises:
   a first sensing electrode pattern on one surface of a glass on the cover window; and
   a second sensing electrode pattern on an opposite surface of the glass.

7. A touch window comprising:
   a touch screen panel comprising an active area, in which a touch input is detected, and a dead area in which the touch input is not detected;
   a function area electrically connected with the touch screen panel and having a command icon pattern; and
   a first conductive polymer part on the dead area provided in the function area and having a light source mounted thereon,
   wherein the touch screen panel comprises:
   a cover window comprising the active area and the dead area;
   a sensing electrode pattern part on the active area;
   a wiring electrode pattern part on the dead area; and
   a second conductive polymer part on the dead area,
   wherein a connector connected with the wiring electrode pattern part is mounted on the second conductive polymer part,
   wherein the wiring electrode pattern part transmits a touch sensing signal detected from the sensing electrode pattern part, and the connector comprises a driving chip driven according to the touch sensing signal,
   wherein the second conductive polymer part is in direct physical contact with the cover window,
   wherein the connector and the driving chip are disposed on the dead area of the cover window,
   wherein the active area is displayed on a screen of the touch window,
   wherein the sensing electrode pattern part is connected with the wiring electrode pattern part;
   wherein the sensing electrode pattern part, the wiring electrode pattern part, and the first conductive polymer part are all in direct physical contact with a same surface of the cover window; and
   wherein the first conductive polymer part is spaced apart from the active area.

8. The touch window of claim 7, wherein the wiring electrode pattern part is connected with the connector through a pad part.

9. The touch window of claim 7, wherein the first conductive polymer part or the second conductive polymer part comprises at least one of conductive materials comprising Teflon, acryl, and urethane.

* * * * *